PRIVATE BRANCH TELEPHONE SYSTEM WITH CAMP-ON FACILITIES

Filed July 29, 1964 5 Sheets-Sheet 1

INVENTOR
L. E. THELEMAQUE
BY
J. A. McCorkendale
ATTORNEY

Nov. 28, 1967 L. E. THELEMAQUE 3,355,555

PRIVATE BRANCH TELEPHONE SYSTEM WITH CAMP-ON FACILITIES

Filed July 29, 1964 5 Sheets-Sheet 2

3,355,555

PRIVATE BRANCH TELEPHONE SYSTEM WITH CAMP-ON FACILITIES

Louis E. Thelemaque, Brooklyn, N.Y., assignor to Bell Telephone Laboratories, Incorporated, New York, N.Y., a corporation of New York Filed July 29, 1964, Ser. No. 385,973
8 Claims. (Cl. 179—18)

ABSTRACT OF THE DISCLOSURE

An automatic telephone system including an electromechanical, common control private branch exchange under marker control with a special trunk, accessed by special dial code, permitting a calling party to camp-on a busy called party's line. A triple-interval timer controls application of distinctive tone to the parties when camp-on is accomplished, preservation of ringback under substantially simultaneous hangup by both parties, and cancellation of ringback upon the calling party's failure to answer within a reasonable period.

This invention relates to a telephone system and more particularly to an automatic telephone system which includes a private branch exchange.

The inclusion of the so-called "camp-on" feature in telephone systems has been previously proposed and disclosed in the art; the camp-on arrangement provides, in general, that when connection is attempted to a called line and the called line is found to be busy, the partially completed connection is "held" until the called line becomes free, whereupon the connection is completed and the called party signaled. Provision of the camp-on feature is particularly desirable in connection with private branch exchange operations in order that one extension user, for example an executive of the firm, may be able to complete a connection to an associate without undue delay and without repetitious dialing even though the associate's extension may be busy when the call is first attempted. It is, of course, desirable that the calling party, particularly if on an executive level, be relieved of the necessity of actually "staying on" the call but that he be able, after establishing the camp on, to go on hook and take up other tasks.

There is disclosed in S. B. Weinberg United States Patent 3,112,373, Nov. 26, 1963, a camp-on arrangement in accordance with which the originating caller, after having established a camp-on relationship with the busy called extension, may go on hook, and as soon as the called extension terminates the first call and goes on hook, both the originating calling extension and the called extension are rung. After the camp-on condition has been established the ringback path for ringing the calling party when the called party goes on hook is set up as soon as the calling party goes on hook with the called party still busy and off hook.

While the general arrangement disclosed in the Weinberg patent has proven in actual use to embody many desirable features and to operate in a generally satisfactory manner, some trouble has none the less been experienced due to what may be referred to as "simultaneous hangup." As pointed out above, the ringback path to the originating party is set up only if the called party is still off hook when the originating party hangs up. Now it has been found in actual practice that very often the two parties will hang up practically simultaneously, or that the called party will actually reach the on-hook condition during the short interval in which the originating caller is moving the handset from its active position to the on-hook position. In such instances as these the ringback path is not set up even though the originating caller does, of course, assume that such path has been prepared and that he will be rung as soon as the called party terminates the first call and goes on hook. This situation is obviously misleading and undesirable particularly from the standpoint of the originating caller.

Accordingly, it is an object of my invention to improve the arrangement and operation of camp-on circuits.

A more specific object of the invention is to enhance the reliability of ringback circuits when used in conjunction with camp-on arrangements.

A still more specific object of the invention is to improve the performance of ringback circuits through reducing the likelihood of failure thereof due to simultaneous hangup by both calling and called parties.

In accordance with a specific embodiment of the invention, as applied particularly to a private branch exchange of the crossbar type, a calling party, for example an executive of the firm, upon calling another extension in the usual manner and finding the station "busy," may hang up and reinitiate the call by dialing the code assigned to a special executive trunk. After seizing the executive trunk and receiving a second dial tone the caller dials the number of the original called extension and the executive trunk camps on that extension. A tone is transmitted to both parties after which the calling party may either remain off hook or hang up. In the first case, the called party is rung as soon as he goes on hook, after termination of the first call, and the calling party receives ringing induction as indication that the call is being put through. In the second case, that is with the calling party back on hook, both parties are rung as soon as the called party goes on hook; if the calling party does not respond to the ringback within a predetermined period, for example 35 seconds, the ringback connection is automatically cancelled and the circuit restores to normal. Means are provided whereby the ringback connection is established even though the called subscriber hangs up first provided the calling party reaches the on-hook position within a short interval, for example five seconds, after the called party has hung up. This prevents failure of the ringback due to "simultaneous hang-up" by the two parties.

A feature of the invention is means whereby the normal ringback condition is effected provided the calling party, after establishing a camp-on condition, reaches the on-hook condition within a predetermined short interval, for example five seconds, after the called party hangs up.

A still further feature of the invention is means for automatically initiating a call for a dial pulse register when the executive trunk is seized by the originating caller whereby to permit through dialing of the code of the called extension.

Yet another feature is the provision of three separate timed sequences and the use thereof to control the camp-on tone, to permit a ringback connection to be completed in the vent of simultaneous hangup by the calling and called parties, and to cancel a ringback connection if the calling party does not respond within a predetermined interval.

Still another feature of my invention is that calls are completed at the terminating end of the executive trunk on a central office-to-station connection class whereas originating connections are completed on a station-to-miscellaneous trunk class. This permits the use of camp on at the terminating end of the trunk and direct trunk selection at the originating end.

A full understanding of the arrangement contemplated by the present invention as well as an appreciation of the various advantageous features thereof may be gained from consideration of the following detailed description in connection with the accompanying drawing, in which.

The arrangement and operation of the various components of the illustrative embodiment of the invention will be described in detail subsequently with reference to FIGS. 2 to 5. However, in order to first gain a general overall understanding of the arrangement contemplated, a brief general description will be given at this time with reference to FIG. 1.

Figure 1:
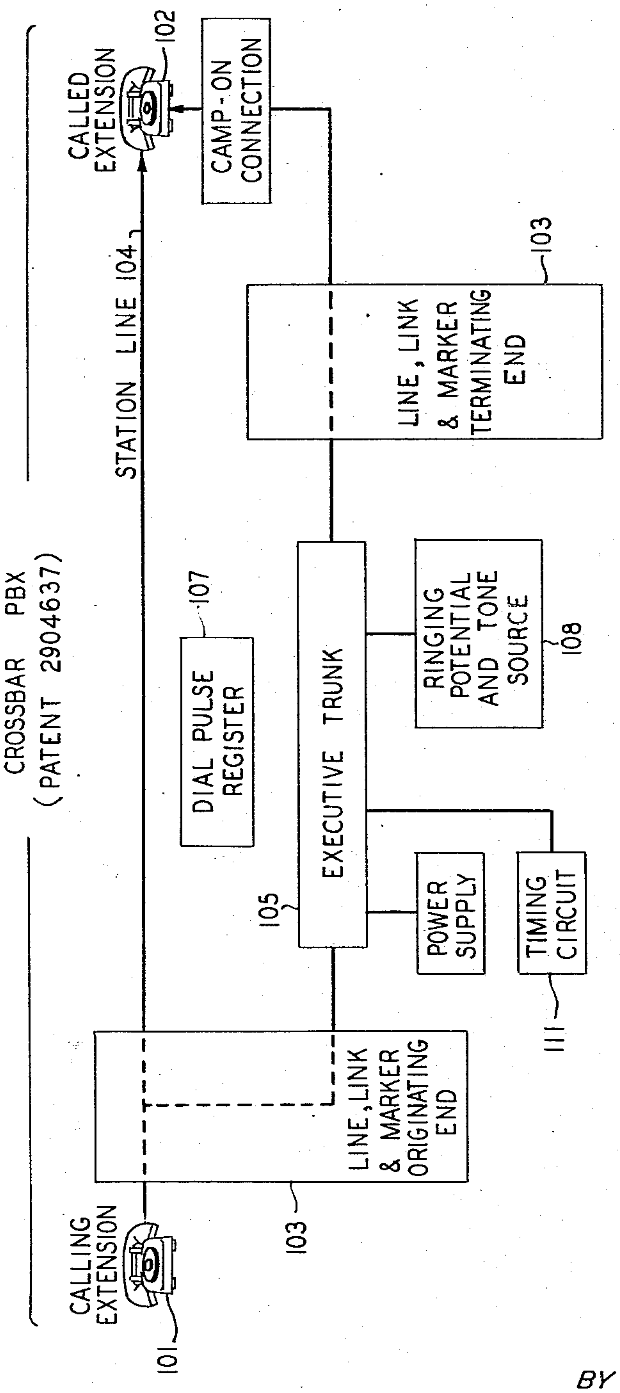
FIG. 1 shows schematically the arrangement and relationship of certain of the basic individual circuits which comprise one specific illustrative embodiment of the camp-on system contemplated by the invention.
Figure 6:
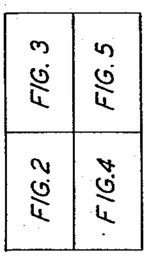
FIG. 6 shows the manner in which certain of the figures should be arranged to show the specific illustrative embodiment of the invention.

Referring, therefore, to FIG. 1, portions of a crossbar PBX are shown in highly schematic form; it will be assumed for purposes of simplified disclosure that the PBX follows the general arrangement described in detail in R. D. Williams Patent 2,904,637 issued Sept. 15, 1959. The camp-on circuit contemplated by the present invention is particularly adapted to use in conjunction with the basic switching and controlling circuits fully described in the Williams patent and such circuits will be described herein only to the extent necessary for full understanding of the present invention.

It will be assumed that the party at extension 101 of the PBX, which party we shall assume to be an executive of the firm, wishes to call extension 102 and accordingly dials that number after having received dial tone in the usual manner through line, link and marker circuit 103 and associated circuits. It will be assumed, further, that when completion of the call in the usual manner over station line 104 is attempted, extension 102 is found to be busy. Now the caller, if he so desires, may hang up and immediately reinitiate the call by dialing the code assigned to the special executive trunk 105 which is seized through normal action of the line, link and marker circuit 103 at the originating end; this connection is completed on a station-to-miscellaneous trunk class basis as will be further discussed subsequently. When the executive trunk 105 has been seized an automatic request for connection of a dial pulse register, as register 107, is initiated at the terminating end of the special trunk; camp on will be denied at this time to any caller attempting to camp on the line of extension 101. When the marker has completed the originating connection and becomes available, it then operates to connect the dial pulse register to the terminating end of the executive trunk 105 and a second dial tone is transmitted to calling extension 101 in the usual manner.

After receiving the second dial tone the originating caller again dials the code of called extension 102 and the line, link and marker circuit operates to complete a connection to extension 102 on a central office trunk-to-station class basis. Assuming that called extension 102 is still busy, executive trunk 105 will be connected to extension 102 on a camp-on basis and not on an actually cut-through basis. When the camp-on connection has been completed, a tone, for example in two short spurts, is applied from source 108 through executive trunk 105 to both calling extension 101 and called extension 102. This tone serves as a warning to the party at the called extension that an executive level call is being attempted to his station and as an indication to the party at the calling extension that the camp-on connection has been established. The duration of the tone is determined by the first of three timed sequences controlled by timing circuit 111.

After receiving the tone spurts the calling party may either remain off hook or he may hang up. In the event the calling party elects to remain off hook, called extension 102 will be rung as soon as the called party hangs up at termination of the first call, and ringing induction will be received at calling extension 101 as indication to the calling party that his call is now being put through. However, in the event the calling party elects to hang up after receiving the tone indicating that camp on has been completed, both extensions 101 and 102 will be rung as soon as the called extension 102 has gone on hook after termination of the first call. The first party to answer will receive ringing induction until the other party answers.

Ringback, that is ringing to the calling extension 101, will continue until the calling party responds provided this response is within an interval the duration of which is determined by a second of three timed sequences controlled by timing circuit 111. If a response is not forthcoming before the end of this interval, which may be, for example, 35 seconds, the ringback is automatically cancelled and executive trunk 105 is restored to normal. The circuit is not held up indefinitely, therefore, in the event the calling party after establishing the camp on had left the area and was not available to respond to the ringback. Also, in the event the calling party, after having established camp on and gone on hook, again goes off hook to initiate another call the ringback is cancelled and the executive trunk restored to normal.

The ringback path is, as pointed out above, established as soon as the calling party goes on hook after having set up the camp-on connection. He may now take up other tasks confident that as soon as the call can be completed he will be rung back. However, as also pointed out above, it has been found in actual use of camp-on arrangements of this general nature, that both extensions will frequently go on hook simultaneously or that the called extension will actually reach the on-hook position while the calling party is in the act of moving his handset from the active position to the on-hook position. In accordance with a novel feature of the present invention ringback is still established under such conditions provided the calling extension reaches the on-hook position within a predetermined interval after the called extension has hung up. The duration of this interval is determined by the last of three timed sequences controlled by timing circuit 111 and may be, for example, five seconds. As will be described in detail subsequently with particular reference to FIGS. 2 to 5, this interval is automatically changed to the normal 35-second interval for ringback duration in the event the calling extension reaches the on-hook position before the expiration of the first interval.

As soon as called extension 102 has answered the call from calling extension 101, the line of the latter extension becomes available for camp-on connections by other parties. Disconnection from a talk connection may be initiated by either calling extension 101 or called extension 102; when either party goes on hook the originating and terminating link connections will release and the executive trunk 105 will restore to normal.

A more detailed description of the specific illustrative embodiment of the executive camp-on system contemplated by the invention will now be given with particular reference to FIGS. 2 to 5 of the drawing. The circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example, the winding of relay 4RSS appearing in FIG. 4. Further, each contact designation is followed by a numeral in parentheses which indicates the figure of the drawing in which the contact appears, for example the designation "4RSS–1(2)" indicates that transfer contact No. 1 of relay 4RSS appears in FIG. 2 while the relay winding, as pointed out above, appears in FIG. 4. In accord with usual circuit design transfer contact pairs may be either Early Make-Break (continuity) or Early Break-Make (sequence transfer) as dictated by the particular circuit operational requirements.

*Originating marker connections; trunk seizure; dial tone*

Figure 2:
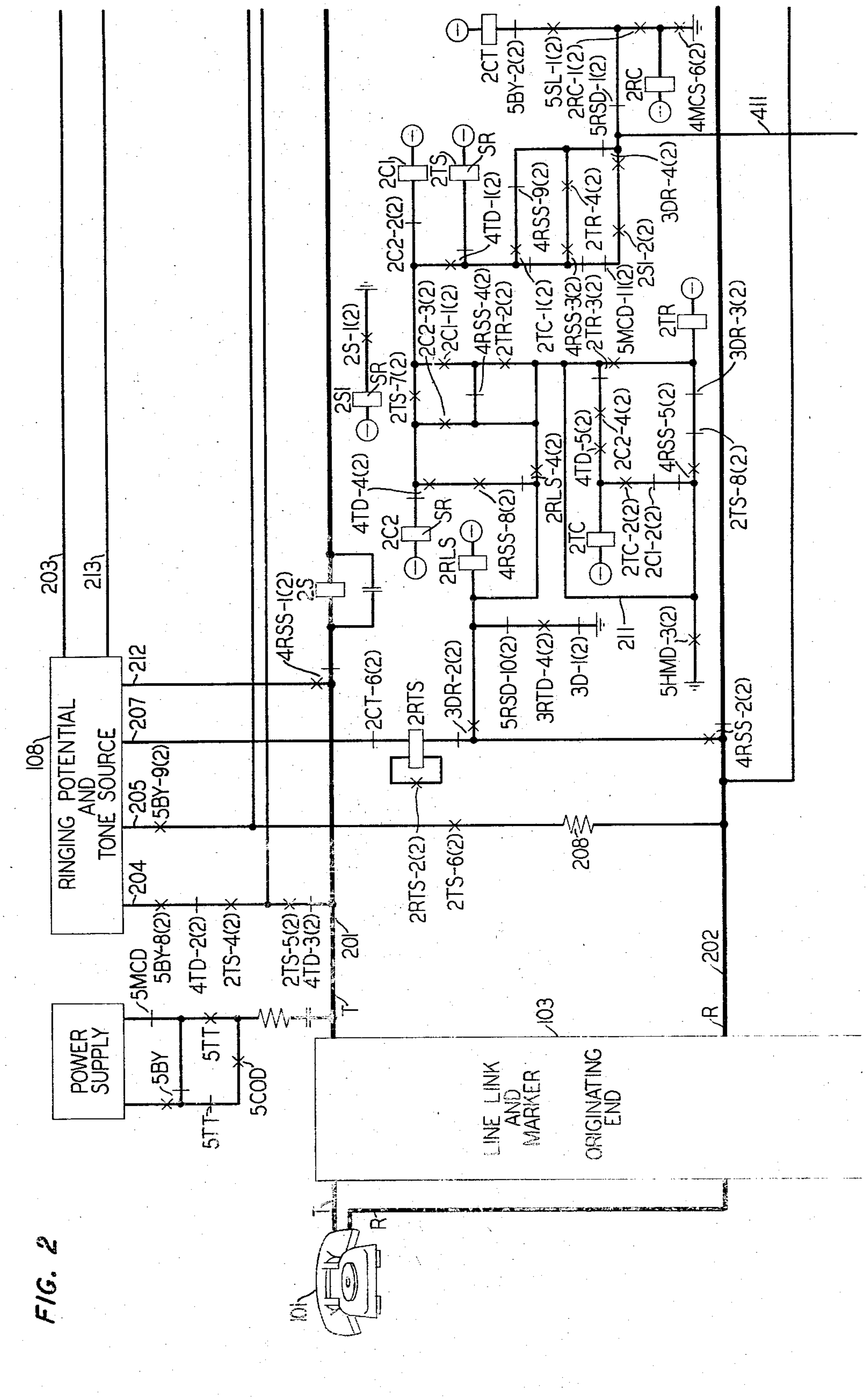
FIGS. 2 and 3 show circuit details of the executive trunk.
Figure 3:
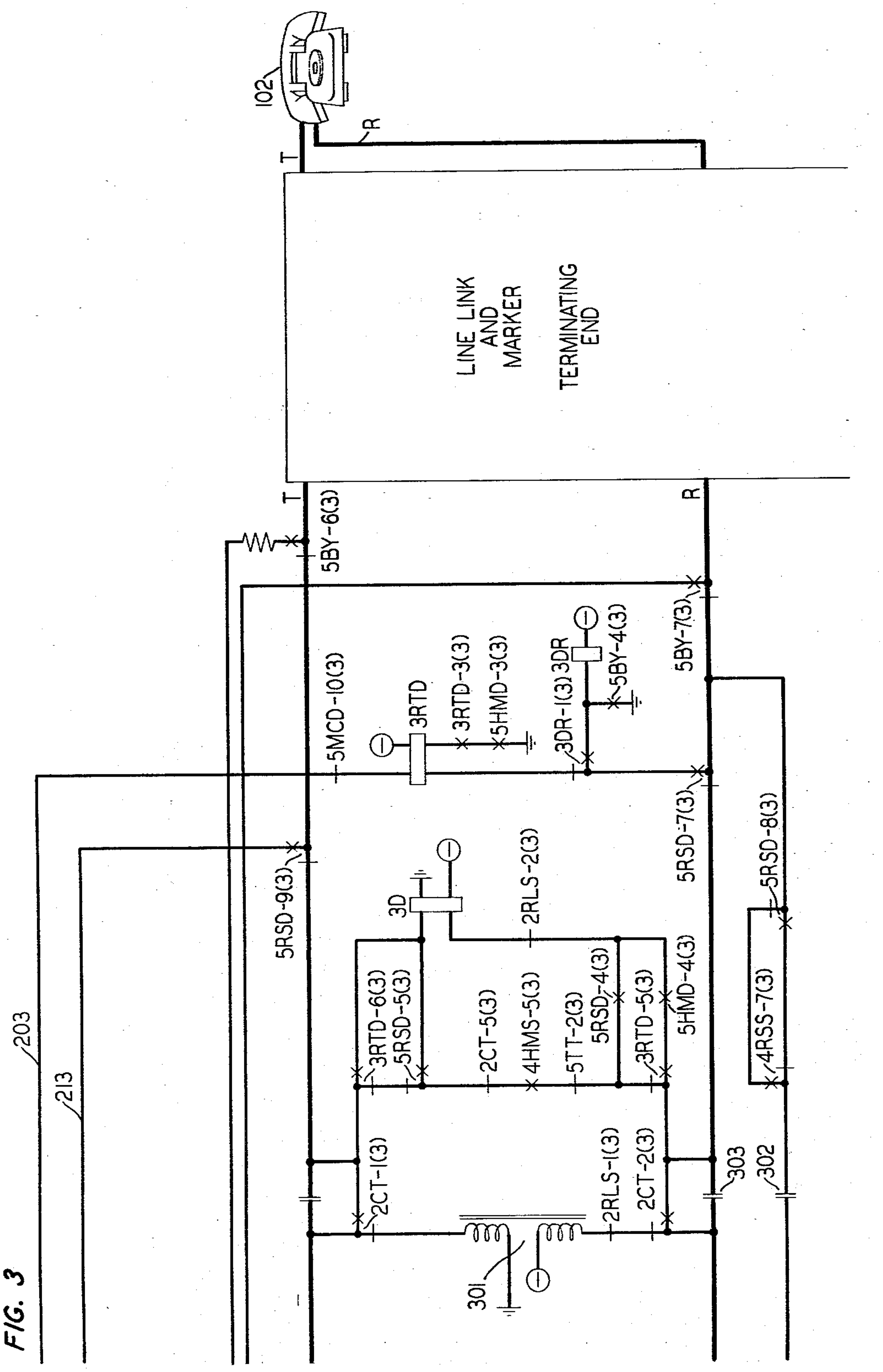
Figure 4:
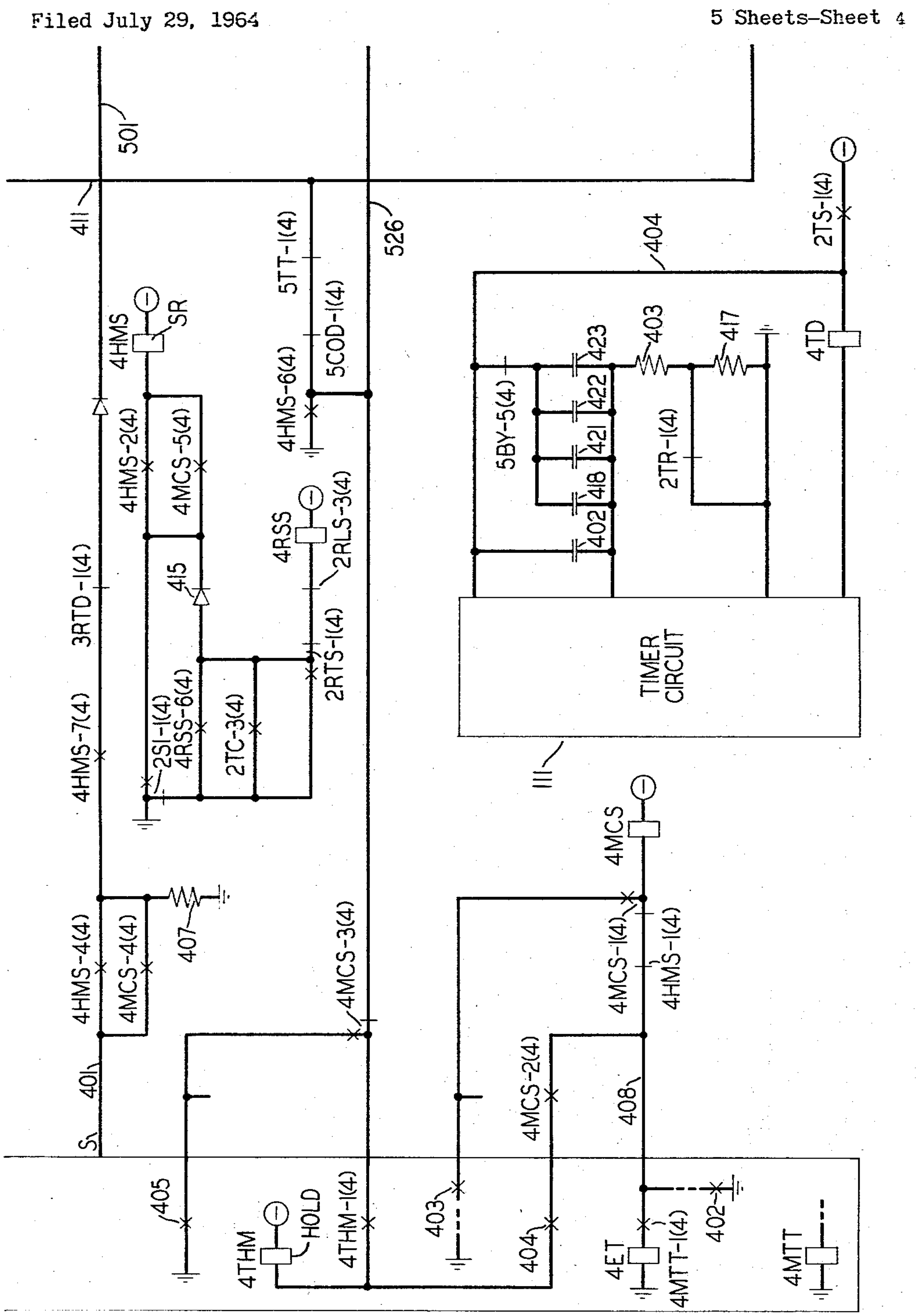
FIG. 4 shows certain of the relays associated with the marker circuit at the originating end together with the timing circuit.
Figure 5:
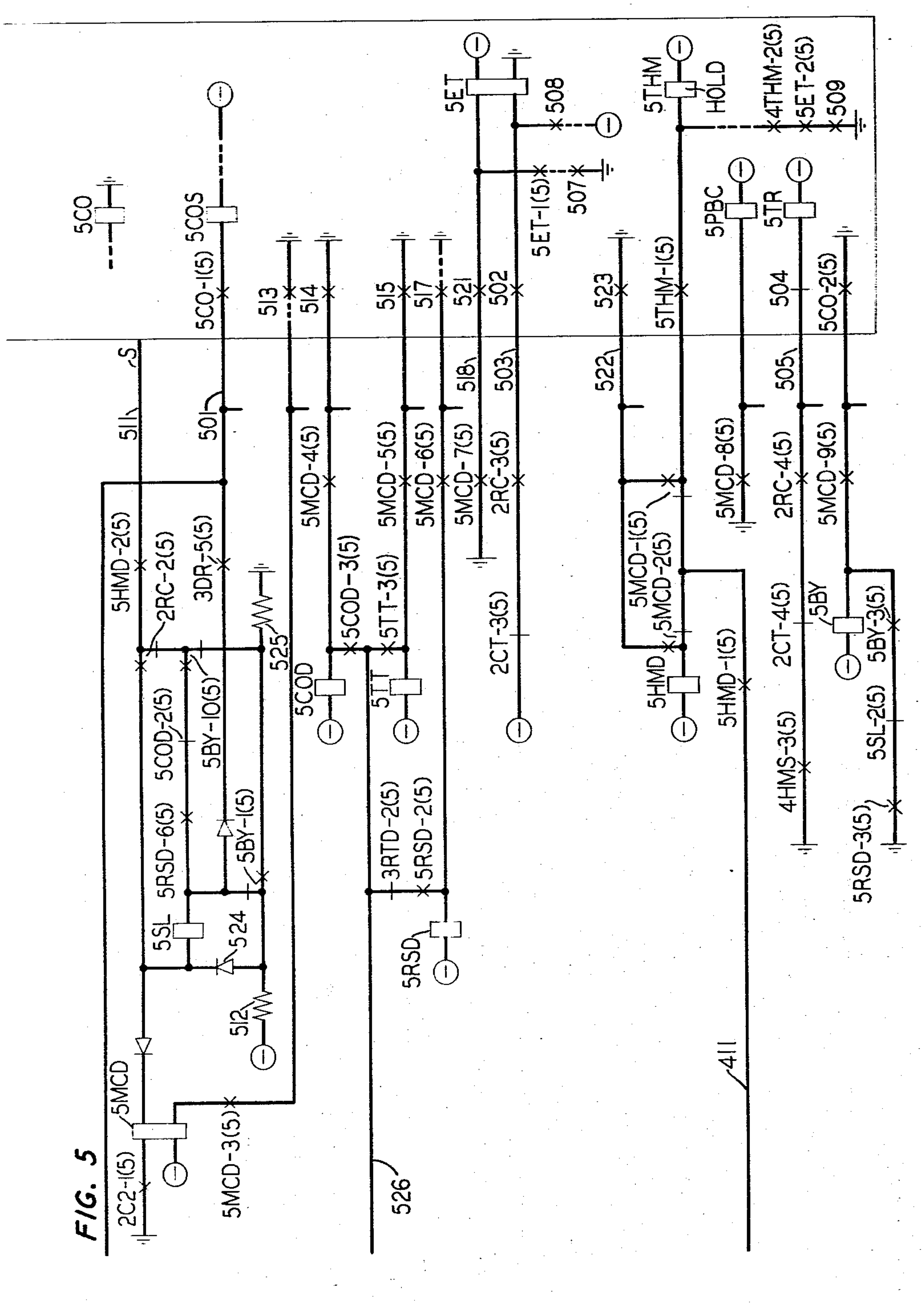
FIG. 5 shows certain of the relays associated with the marker circuit at the terminating end.

Referring now to FIG. 2, it will be assumed that the party at extension 101 had dialed the code of extension 102 and found it busy and had then gone on hook and then reinitiated the call by going off hook and dialing the code of the special executive trunk. The executive trunk shown schematically in FIG. 1 (captioned box 105) is shown in detail in FIGS. 2 to 5 and, as will be described subsequently, includes tip lead 201, ring lead 202 and sleeve lead 401. After the code digits are dialed the dial pulse register, operating in its normal manner, will signal the line, link and marker circuit to complete the connection to the originating end of the special executive trunk on a station-to-miscellaneous trunk class basis. Since the operations of the line, link and marker circuit and associated circuits have been fully described in earlier patents, for example in the Williams Patent 2,904,637 referred to above, such operations will be described herein only to the extent necessary for full understanding of the executive camp-on trunk operation.

The operation of relay 4MTT of the marker will start trunk testing in the normal manner and if the executive trunk is found idle, relay 4ET of the marker will operate from battery, winding of relay 4MCS, break contact of transfer pair 4MCS–1(4), break contact 4HMS–1(4), make contact 4MTT–1(4), winding of relay 4ET to ground. The characteristics of relay 4MCS are such that it does not operate over this path. However, when as the result of further normal marker operations, make contact 402 closes, relay 4MCS operates over this more direct path to ground, and upon operating, locks to ground through the make contact of its transfer pair 4MCS–1(4) and make contact 403 which is controlled by marker action. Relay 4MCS, operated, completes an operate path for trunk hold magnet 4THM from battery, winding of hold magnet, make contact 404, which is controlled by marker action, make contact 4MCS–2(4) to ground at make contact 402, and, after operation of the hold magnet, closes a hold path therefor through make contact 4THM–1(4), the make contact of transfer pair 4MCS–3(4) and make contact 405 which is controlled by normal marker action. Also, relay 4MCS, operated, closes through make contact 4MCS–4(4) sleeve lead 401 at the originating end of the trunk to ground through resistor 407, partially completes at make contact 4MCS–5(4) an operate path for relay 4HMS and completes at make contact 4MCS–6(2) an operate path for relay 2RC.

When trunk hold magnet 4THM operates and closes the crossbar switch crosspoints at the originating end of the executive trunk, relay 2S operates from ground, upper coil of inductor 301, break contact of transfer pair 2CT–1(3), tip 201, winding of relay 2S, break contact of transfer pair 4RSS–1(2), the closed loop at extension 101, ring 202, break contacts of transfer pairs 4RSS–2(2) and 2CT–2(3), break contact 2RLS–1(3), lower winding of inductor 301 to battery. Operation of relay 2S is followed in turn by operation of relay 2S1 (path completed at 2S–1(2) make contact) and by operation of relay 4HMS (path completed through make contact of transfer pair 2S1–1(4) and 4MCS–5(4) make contact).

Relay 4HMS upon operating locks to ground through its make contact 4HMS–2(4); partially completes at make contact 4HMS–3(5) the operate path for relay 5TR of the marker, terminating end; and provides through make contact 4HMS–4(4) a secondary path to the sleeve ground at the originating end of the trunk. Also relay 4HMS, operated, maintains a busy indication toward the marker by isolating at break contact 4HMS–1(4) battery from lead 408 when relay 4MCS releases; closes at make contact 4HMS–5(3) the tip and ring loop toward the terminating end of the trunk; closes at make contact 4HMS–6(4) the path to the fundamental trunk ground; and completes at make contacts 4HMS–4(4) and 4HMS–7(4) the connection between the originating end sleeve lead 401 and lead 501 whereby to operate relay 5COS (camp-on stop), it being understood that relay 5CO has been previously operated under marker control. Relay 5COS, operated, functions in its normal manner in conjunction with other elements of the marker to prevent any other caller from camping on the line of the originating calling extension 101. According to this novel feature of the invention, the calling line is kept free of camp-on connections by other calling parties until the connection to called extension 102 has been completed; this feature will be further discussed subsequently.

Relay 2RC, operated as above described, locks through its make contact 2RC–1(2), break contact 5RSD–1(2), line 411, break contacts 5COD–1(4) and 5TT–1(4), to fundamental ground at make contact 4HMS–6(4); partially completes at the make contact of transfer pair 2RC–2(5) an operate path for relay 5SL; closes at make contact 2RC–3(5) a path to battery on trunk test lead 503 at the terminating end of the trunk; and closes at make contact 2RC–4(5) trunk originate lead 505 toward the line, link and marker circuit. When the marker completes the connections at the originating end as described above, relay 4MCS releases through normal marker action and when the marker subsequently becomes available again, closing break contact 504, relay 5TR operates to request a dial pulse register connection at the terminating end of the executive trunk. When make contact 508 closes through subsequent marker action, relay 5ET operates on its lower winding and, upon operation, locks through its upper winding, its make contact 5ET–1(5) and make contact 507 closed through marker action. Relay 5ET, operated, identifies the trunk requesting dial tone in the usual manner. The trunk hold magnet at the terminating end, 5THM, now operates from ground, make contact 509 closed through marker action, make contact 5ET–2(5), make contact of the originating end trunk hold magnet 4THM–2(5), winding of hold magnet 5THM to battery. Relay 5HMD now operates from this same ground, make contact 5THM–1(5), the break contacts of respective transfer pairs 5MCD–1(5) and 5MCD–2(5), winding of relay 5HMD to battery. Relay 5HMD upon operating locks through its make contact 5HMD–1(5) to the fundamental trunk ground at make contact 4HMS–6(4).

Through normal operations of the attached dial pulse register at this time ground is applied to the terminating end sleeve lead 511, and relay 5SL operates from battery, resistor 512, break contact of transfer pair 5BY–1(5), winding of relay 5SL, make contact of transfer pair 2RC–2(5), make contact 5HMD–2(5) to the ground on sleeve lead 511 from the register.

Relay 5SL, operated, closes an operate path for relay 2CT from ground, make contacts 4MCS–6(2), 2RC–1(2) and 5SL–1(2), break contact 5BY–2(2), winding of relay 2CT to battery. Relay 2CT, operated, opens marker leads 503 and 505 at break contacts 2CT–3(5) and 2CT–4(5) respectively, whereby to block further originating signals to the marker; directly couples the register to the originating end of the trunk by closing the tip and ring at the make contacts of respective transfer pairs 2CT–1(3) and 2CT–2(3); and opens the trunk loop toward the terminating end of the trunk at the break contacts of the respective transfer pairs just identified. Dial tone is now supplied from the register attached at the terminating end of the trunk to the originating caller at extension 101.

*Terminating connections—called station busy*

After receiving dial tone over the special executive trunk as described above, the calling party dials the code of the called extension which is assumed to still be busy on a previous call. At the completion of dialing the marker (terminating end) will receive the digit, horizontal group and class of service information from the register in the usual manner. The operation of the class relays in this instance will cause the marker to complete the connection as a central office originating connection. Accordingly, the marker will connect battery potential in the register which will, in turn, connect this battery potential to sleeve lead 511 at the terminating end of the trunk whereby to operate relay 5MCD over an obvious path through its upper winding to ground at make contact 2C2–1(5). Relay 5MCD upon operating locks through its lower winding and make contact 5MCD–3(5) to ground at the marker under control of make contact 513. Relay 5MCD, operated, connects relays 5COD, 5TT, 5RSD, and 5BY to the line, link and marker circuit through respective make contacts 5MCD–4(5), 5MCD–5(5), 5MCD–6(5) and 5MCD–9(5), opens ringing lead 203 toward the terminating end of the special trunk at break contact 5MCD–10(3), and connects ground through make contact 5MCD–7(5) to lead 518 whereby to provide a locking path for relay 5ET. Also, through normal marker operations at this point the battery potential referred to above is removed from the terminating end sleeve lead 511 and the holding path for trunk hold magnet 5THM and relay 5HMD is transferred from lead 411 to lead 522 with ground at make contact 523. Relay 5RSD is operated at this point from marker ground through make contacts 517 and 5MCD–6(5) and locks to the fundamental ground through its make contact 5RSD–2(5), break contact 3RTD–2(5), lead 526 and make contact 4HMS–6(4).

Relay 5RSD, operated, releases relays 2CT and 2RC by interrupting the holding path therefor at break contact 5RSD–1(2); relay 5SL releases following release of relay 2RC since the operate path is interrupted at the make contact of transfer pair 2RC–2(5). Also, relay 5RSD, operated, closes an operate path for relay 3D from battery, lower winding of relay 3D, break contact 2RLS–2(3), make contact 5RSD–4(3), break contact 5TT–2(3), make contact 4HMS–5(3), break contact 2CT–5(3), the make contact of transfer pair 5RSD–5(3), the upper winding of relay 3D to ground.

Since the called extension 102 is busy, relay 5CO of the marker will be operated at this time and relay 5BY operates to ground through make contacts 5MCD–9(5) and 5CO–2(5) and, upon operating, locks to ground through its make contact 5BY–3(5), break contact 5SL–2(5) and make contact 5RSD–3(5). Relay 5BY, operated, closes an operate path for relay 3DR at make contact 5BY–4(3), opens at break contact 5BY–5(4) one path of the timing circuit 111 (FIG. 4) whereby to render the path through capacitor 402 controlling, extends the tone leads 204 and 205 toward the tip and ring conductors at make contacts 5BY–8(2) and 5BY–9(2); switches at transfer pairs 5BY–1(5) and 5BY–10(5) the sensing circuit at the terminating sleeve 511 so that when relay 2RC releases and relay 5RSD operates, the sensing circuit will effectively comprise diode 524, relay 5SL, and a voltage divider including resistors 512 and 525; and switches the tip and ring of the line at the terminating end to the tone leads 204 and 205 through the make contacts of respective transfer pairs 5BY–6(3) and 5BY–7(3).

Relay 3DR, operated as above described, switches ringing leads 203 and 207 at the make contacts of respective transfer pairs 3DR–1(3) and 3DR–2(2) to connect relay 3DR and relay 2RLS to the ring lead 202 when, and if, relays 4RSS and 5RSD operate; opens at break contact 3RD–3(2) the operate path of relay 2TR and partially closes at the make contact of transfer pair 3DR–4(2) one operate path of relay 2TS.

*Application of camp-on tone to line*

When relay 5MCD releases following completion of the camp-on connection to the line of called extension 102, relay 2TS operates from fundamental ground on lead 411, make contact of transfer pair 3DR–4(2), make contact 2S1–2(2), break contact 5MCD–11(2) and break contacts of respective transfer pairs 4RSS–3(2), 2TC–1(2) and 4TD–1(2), winding of relay 2TS to battery.

Since relay 5BY is operated, relay 2TS operates, closes tone lead 204 to tip lead 201 through make contacts 5BY–8(2), 2TS–4(2) and 2TS–5(2) and closes tone lead 205 to ring lead 202 through make contacts 5BY–9(2) and 2TS–6(2), resistor 208 being included in this connection. Since relay 5BY is operated the tone leads are also connected to the tip and ring at the terminating end of the trunk through the make contacts of respective transfer pairs 5BY–6(3) and 5BY–7(3). Tone from source 108 is supplied at this time, therefore, both to the calling extension 101 and the called extension 102, the duration of the tone being controlled by timer circuit 111 as described below.

Relay 2TS, operated as above described, closes battery through make contact 2TS–1(4) to start timer circuit 111. Timer circuit 111 may be any one of the many time delay circuits known in the art. For example, it may comprise a three-transistor circuit wherein the first two transistors are so connected as to comprise the equivalent of a single transistor with a forward-current transfer ratio close to unity. These two transistors will remain cut off until the external timing capacitor (or capacitors in combination) has charged sufficiently to allow the base of one transistor to become positive with respect to its emitter. At this point the two transistors start to conduct; this causes the base of the third transistor to become negative with respect to its emitter and drive the transistor into saturation. Saturation of the transistor applies ground to the external relay causing operation thereof. Upon removal of voltage from the circuit the relay releases and the timing capacitor discharges. It will be assumed in the following description that the general arrangement of timer circuit 111 is as above described.

At this point, that is when battery is closed to the timer circuit by operation of relay 2TS as above described, the timed interval will be dependent upon the characteristics of capacitor 402 and resistor 403 since, with relay 5BY operated and relay 2TR released, a path is closed for charging capacitor 402 from battery, make contact 2TS–1(4), lead 404, capacitor 402, resistor 403, break contact 2TR–1(4) to ground. As above described, the transistor circuit will remain OFF until capacitor 402 has charged to a sufficient potential to allow the base of one transistor to become positive with respect to its emitter; it will be assumed for purposes of description that in the present instance this requires approximately one-half second. At the end of the one-half second interval, therefore, relay 4TD will operate.

Relay 4TD, operated, starts the release of relay 2TS (slow-release) by interrupting the operate path thereof at the break contact of transfer pair 4TD–1(2), opens tone lead 204 at break contacts 4TD–2(2) and 4TD–3(2) thereby removing the audible tone from the line, and closes at the make contact of transfer pair 4TD–1(2) an operate path for relay 2C1 which, upon operating, locks through break contact 2C2–2(2), make contact 2C1–1(2), break contact 4RSS–4(2), lead 211 to ground at make contact 5HMD–3(2).

Relay 2TS, upon releasing fully, releases relay 4TD by interrupting the battery path at make contact 2TS–1(4); relay 4TD, released, reoperates relay 2TS by closing the operate path at the break contact of transfer pair 4TD–1(2) thereby initiating a second cycle of timer circuit 111. Relay 2TS, reoperated, functions the same as before and audible tone is again supplied to both calling and called extensions. In addition, relay 2TS operated in the second cycle closes a path for operating relay 2C2 since relay 2C1 is now operated, the path being traced from battery, winding of relay 2C2, break contact of transfer pair 4TD–4(2), make contact 2TS–7(2), make contact 2C1–1(2), break contact 4RSS–4(2), lead 211, make contact 5HMD–3(2) to ground. Relay 2C2, upon operating, locks through its make contact 2C2–3(2) to the ground at make contact 5HMD–3(2); releases relay 2C1 by interrupting the operate path at break contact 2C2–2(2); and partially completes an operate path for relay 2TC at make contact 2C2–4(2).

At the end of the second cycle of one-half second audible tone, relay 4TD operates as before; relay 2C1 cannot reoperate at this time as the operate path therefor is open at break contact 2C2–2(2). Relay 4TD, reoperated, does however close an operate path for relay 2TC from battery, winding of relay 2TC, make contacts 4TD–5(2) and 2C2–4(2), break contact of transfer pair 2TR–3(2), lead 211, to ground at make contact 5HMD–3(2), and also releases relay 2C2 by interrupting the holding path at the break contact of transfer pair 4TD–4(2). Relay 2C2 has a slow-release characteristic and relay 2TC, whose operate path includes make contact 2C2–4(2), operates before relay 2C2 has fully released.

Relay 2TC, upon operating, locks to ground at make contact 5HMD–3(2) through its make contact 2TC–2(2) and break contact 2C1–2(2). Relay 2TC, operated, opens at the break contact of transfer pair 2TC–1(2) the operate path for relays 2TS and 2C1, thereby prohibiting another cycle of one-half second tone, and closes at make contact 2TC–3(4) a portion of the operate path for relay 4RSS. With relays 2TS and 4TD released, the timer and tone supply circuits are restored to normal condition.

*Ringback established—extensions rung*

After the calling subscriber has received the two spurts of tone indicating that camp on has been established as described above, he may either remain off hook or may hang up. In the first instance, the called extension will be rung as soon as available and the calling party will receive ringing induction through capacitor 302 as indication to him that his call is being put through. In the present case, however, it will be assumed that the calling party at extension 101 elects to hang up and await ringback and it will be assumed, further, that he does in fact reach the on-hook position while the called extension 102 is still off hook.

When extension 101 goes on hook and interrupts the station loop, relay 2S will release and, in turn, release relay 2S1. Relay 2S1, released, closes an operate path for relay 4RSS from ground, break contact of transfer pair 2S1–1(4), make contact 2TC–3(4), break contact of transfer pair 2RTS–1(4), break contact 2RLS–3(4), winding of relay 4RSS to battery; relay 4HMS holds operated from the ground, through make contact 2TC–3(4), diode 415 and make contact 4HMS–2(4). Relay 4RSS, upon operating locks through its make contact 4RSS–6(4) to the ground at transfer pair 2S1–1(4); establishes at the same make contact a supplementary holding path for relay 4HMS; opens at the break contact of transfer pair 4RSS–7(3) the path connecting the originating and terminating ends of the executive trunk through capacitor 302; partially completes at make contact 4RSS–8(2) an operate path to ground at make contact 5HMD–3(2) for relay 2RLS; connects ringing leads 212 and 207 through the make contacts of respective transfer pairs 4RSS–1(2) and 4RSS–2(2) to tip 201 and ring 202 at the originating end of the trunk; closes a portion of an operate path for relay 2TS at the make contact of transfer pair 4RSS–3(2); releases relay 2TC by opening the hold path at the break contact of transfer pair 4RSS–5(2); and partially completes at the make contact of the last-mentioned transfer pair an operate path for relay 2TR.

Relay 2TC, released as above described, opens the operate path of relay 4RSS at make contact 2TC–3(4), and closes at the break contact of transfer pair 2TC–1(2) a second portion of the operate path of relay 2TS.

Now when the original call has been completed and the called extension 102 goes on hook, opening of the link connection to the called extension results in a potential difference between the voltage divider in the sensing circuit and the line holding magnet associated with the called station. (As pointed out above the sensing circuit effective at this point comprises diode 524, relay 5SL and the voltage divider consisting of resistors 512 and 525.) As a result of the potential difference referred to, relay 5SL operates and, in turn, releases relay 5BY by opening the hold circuit at break contact 5SL–2(5).

Relay 5BY, released, opens tone leads 204 and 205 at make contacts 5BY–8(2) and 5BY–9(2); switches at transfer contact 5BY–10(5) the sleeve lead 511 at the terminating end of the trunk from the operate path of relay 5SL to ground through resistor 525 thereby releasing relay 5SL; closes at break contact 5BY–5(4) a path in the timer further referred to below; opens the holding path for relay 3DR at make contact 5BY–4(3); and closes the tip and ring at the terminating end of the trunk at the break contacts of respective transfer pairs 5BY–6(3) and 5BY–7(3).

Relay 3DR now releases since the called extension loop is interrupted as extension 102 is on hook. Relay 3DR, released, opens at make contact 3DR–5(5) lead 501 to the sensing circuit at the terminating end of the trunk; this opens the locking path for relay 5COS of the marker, which relay 5COS, however, remains operated through its fundamental operate path (previously described) under control of relay 3RTD. Also, relay 3DR released, closes the operate path of relay 2TR at break contact 3DR–3(2); closes ringing lead 207 through the break contact of transfer pair 3DR–2(2) to ring 202 at the originating end of the trunk; and closes ringing lead 203 through the break contact of transfer pair 3DR–1(3) to the ring lead at the terminating end of the trunk. Ringing potential is now supplied to calling extension 101 from source 108 over ringing lead 212, the make contact of transfer pair 4RSS–1(2) and tip 201 and over ringing lead 207, break contact 2CT–6(2), right-hand winding of relay 2RTS, break contact of transfer pair 3DR–2(2), make contact of transfer pair 4RSS–2(2) to ring 202. At this same time ringing potential is supplied to called extension 102 over ringing lead 213 and the make contact of transfer pair 5RSD–9(3) to tip 201 and over ringing lead 203, break contact 5MCD–10(3), left-hand winding of relay 3RTD, break contact of transfer pair 3DR–1(3), make contact of transfer pair 5RSD–7(3) to ring 202.

Relay 2TR, operated as above described, locks through the make contact of its transfer pair 2TR–3(2) to ground at make contact 5HMD–3(2); prepares at the make contact of transfer pair 2TR–2(2) a holding path for relay 2C1; opens at break contact 2TR–1(4) the shunt path around resistor 417 whereby to change the timing interval as described below; and closes at make contact 2TR–4(2) an operate path for relay 2TS which operates and closes at make contact 2TS–1(4) the start path for the timer circuit 111.

The sequence of operation in the counter and timer control circuit (relays 2C1, 2C2 and associated control paths) and the timer circuit 111 is similar to that described above in connection with establishing the tone interval; in the present instance, however, with relay 2TR operated and relay 5BY released, all capacitors 402, 418, 421, 422 and 423 and both resistors 403 and 417 are effectively included in the timer circuit operation. The resulting characteristics of the effective controlling circuit are such that the two cycles total approximately 35 seconds, this being the time established during which the calling party at extension 101 must respond to the ringback; if he does not respond to the ringback within this interval, the ringback will be automatically canceled as described below.

*Called extension goes on hook first—ringback established*

As described above, the ringback path was set up when the calling extension went on hook with the called extension still off hook. As also pointed out previously a novel feature of the present invention provides for establishment of the ringback path if the two extensions go on hook simultaneously, or even if the called extension goes on hook first, provided the calling extension reaches the on-hook position within a short interval thereafter, for example within five seconds. In order to describe this novel and valuable feature of the invention it will be assumed that extension 102 is now on hook while extension 101 is still off hook.

Relay 3DR releases following release of relay 5BY as above described; this is followed by operation of relay 2TS through the path including break contact 4RSS–9(2) and the make contact of transfer pair 2TC–1(2). Relay 2TS, operated, opens the operate path of relay 2TR at break contact 2TS–8(2), and closes at make contact 2TS–1(4) the start path for timer circuit 111. In this instance since both relays 5BY and 2TR are released the timing interval is determined by the combination of capacitors 402, 418, 421, 422 and 423 and the single resistor 403. This "third" time interval produced by timer circuit 111 will be assumed to be five seconds and is the interval following hangup by extension 102 within which extension 101 must reach on-hook condition in order for the ringback path to be established.

Assuming first that the calling party does not go on hook within the five-second interval, relay 4TD operates at the end of the five-second interval and closes at the make contact of transfer pair 4TD–1(2) the operate path for relay 2C1 which operates and, in turn, releases relay 2TC by opening the hold path therefor at break contact 2C1–2(2). Also relay 4TD, operated, releases relay 2TS by opening the operate path at the break contact of transfer pair 4TD–1(2) and this, in turn, releases relay 4TD by removing battery at make contact 2TS–1(4). Relay 2TC, released, opens at the make contact of transfer pair 2TC–1(2) the operate path of relay 2TS, thereby limiting this timing sequence to one cycle, and opens at make contact 2TC–3(4) the operate path of relay 4RSS. Relay 4RSS cannot be operated, therefore, whereby to apply ringing potential to the originating end of the trunk through the make contacts of respective transfer pairs 4RSS–1(2) and 4RSS–2(2) and ringback to calling extension 101 cannot be established.

Let us assume now that the calling extension 101 goes on hook before the expiration of the five-second interval and before relay 2TC has released. When the loop at the calling station opens relays 2S and 2S1 release in sequence as described above and relay 4RSS operates through the path provided by make contact 2TC–3(4). (Relay 2TC not yet released.) As described above, relay 4RSS, operated, connects the ringing leads 207 and 212 to the originating end of the trunk. The five-second timing interval described above is now changed to the normal 35-second ringback interval in the following manner. Relay 4RSS, operated, releases relay 2TS by opening one operate path at the break contact of transfer pair 4RSS–3(2) and opening another operate path at break contact 4RSS–9(2), and at the same time releases relay 2C1 if operated. Relay 2TS, released, releases relay 4TD by interrupting the battery path at make contact 2TS–1(4), and operates relay 2TR from ground at make contact 5HMD–3(2), the make contact of transfer pair 4RSS–5(2) and break contacts 2TS–8(2) and 3DR–3(2).

Relay 2TR, operated, initiates a 35-second timed interval as described above, the controlling elements with relay 5BY released and relay 2TR operated being, as previously described, the combination of the capacitors 402, 418, 421, 422 and 423 and the two resistors 403 and 417.

Thus, so long as the calling extension reaches the on-hook position before the end of the predetermined time interval following hangup by the called party, ringback with the normal duration of 35 seconds will be established.

*Calling and called extensions answer ringing*

When the called extension 102 goes off hook in response to the ringing thereby closing a loop at the terminating end of the trunk, relay 3RTD operates on ringing potential through its left-hand winding and locks to ground at make contact 5HMD–3(3) through its right-hand winding and make contact 3RTD–3(3). Relay 3RTD, operated, partially completes at make contact 3RTD–4(2) an operate path for relay 2RLS; switches supervision of relay 3D to the called extension through the make contacts of respective transfer pairs 3RTD–6(3) and 3RTD–5(3) at such time as relay 5RSD releases; releases relay 5RSD by opening the hold path at break contact 3RTD–2(5); and opens lead 401 at break contact 3RTD–1(4), which releases relay 5COS whereby to now permit the line of the calling extension to be camped on. (It will be recalled that according to a novel feature of the invention, camp-on connections by other trunks to the line of the calling extension are prevented so long as the called extension remains busy on the original call.)

Relay 5RSD, released as above described, disconnects the ringing leads from the terminating end tip and ring at the make contacts of transfer pairs 5RSD–9(3) and 5RSD–7(3), and disconnects at the make contact of transfer pair 5RSD–8(3) the connection between the originating and terminating ends of the trunk through capacitor 302.

When the calling extension 101 goes off hook in response to the ringback, provided this occurs within the 35-second interval referred to above, the station loop is closed and relay 2RTS operates on ringing potential through its right-hand winding and, upon operating, closes at make contact 2RTS–2(2) a shunt path on the left-hand winding whereby to impart a slow-release characteristic to the relay. Relay 2RTS, operated, releases relay 4RSS by opening the hold path at the break contact of transfer pair 2RTS–1(4) while maintaining through the make contact of the same transfer pair a hold path for relay 4HMS. Relay 4RSS, released, interrupts at make contact 4RSS–6(4) one holding path for relay 4HMS; opens at the make contact of transfer pair 4RSS–3(2) an operate path of relay 2TS, which releases if operated during the 35-second timed ringing sequence; completes at the break contact of transfer pair 4RSS–7(3) a path for ringing to the terminating end through capacitor 302 (in the event called extension 102 had not answered); interrupts at make contact 4RSS–8(2) one operate path of relay 2RLS; interrupts at the make contact of transfer pair 4RSS–2(2) the operate path of relay 2RTS, which releases slowly; and closes tip 201 and ring 202 at the break contacts of respective transfer pairs 4RSS–1(2) and 4RSS–2(2) whereby to operate relay 2S from battery and ground at inductor 301 through the closed station loop at extension 101. Relay 2S, operated, operates relay 2S1; relay 2S1, operated, now closes a holding path for relay 4HMS through the make contact of transfer pair 2S1–1(4).

The calling extension 101 and the called extension 102 are now in talking connection through the executive trunk.

*Release*

If the calling extension 101 hangs up first from a talking connection thereby opening the station loop at the originating station, relays 2S and 2S1 release in sequence. Relay 2S1, released, releases relay 4HMS by opening the hold path at the make contact of transfer pair 2S1–1(4). Relay 4HMS, released, interrupts at make contact 4HMS–6(4) the connection to fundamental trunk ground thereby releasing relay 5HMD and the originating and terminating trunk hold magnets 4THM and 5THM. Relay 5HMD, released, releases relay 3D by opening the locking path at make contact 5HMD–4(3); releases relay 3RTD by opening the operate path at make contact 5HMD–3(3); and releases any operated relays in the counter and timer control circuit (as relays 2C1, 2C2) by removing the holding ground at make contact 5HMD–3(2). The trunk hold magnets 4THM and 5THM, released, open the links at the originating and terminating ends whereby to restore the trunk to normal.

In the event called extension 102 hangs up first from the talking connection thereby opening the station loop at the terminating end, relay 3D will release. Relay 3D, released, closes at break contact 3D–1(2) an operate path for relay 2RLS which operates and locks to ground at make contact 5HMD3(2) through the make contact of its transfer pair 2RLS–4(2) and over line 211. Relay 2RLS, operated, interrupts at break contact 2RLS–1(3) the battery path through inductor 301 to ring 202 whereby to release relay 2S which was previously held operated through the station loop at the originating end. Trunk restoring action following release of relay 2S is the same as that described above in connection with hangup by calling extension 101 except that in this instance relay 2RLS will release last following release of relay 5HMD whereby to restore the trunk to normal.

*Cancellation of ringback*

The ringback after having been established as described above may be canceled by the calling party if he so desires, and it will be automatically canceled if he does not respond to the ringback within the predetermined timed ringback interval.

Let us assume first that ringing is applied toward the originating end of the trunk after the called extension has gone on hook as described above and, further, that the originating calling party does not respond to this ringback during the interval and that relays 2C2 and 4TD have operated at the end of the second cycle. Relay 2RLS will now operate from ground, make contact 5HMD–3(2), line 211, make contact 2C2–3(2), make contact of transfer pair 4TD–4(2), make contact 4RSS–8(2), break contact of transfer pair 2RLS–4(2), winding of relay 2RLS to battery. (It should be noted that relay 2C2 is slow-to-release so that while its operate path has been opened at the break contact of transfer pair 4TD–4(2) the operate path of the 2RLS relay is completed before relay 2C2 has actually released.) This operate path for relay 2RLS is completed regardless of whether or not called extension 102 has gone off hook in response to the ringing. Relay 2RLS, upon operating, locks to the ground at make contact 5HMD–3(2) through the make contact of its transfer pair 2RLS–4(2); releases relay 3D by interrupting the operate path at break contact 2RLS–2(3); releases relay 4RSS by opening the hold path at break contact 2RLS–3(4); and interrupts at break contact 2RLS–1(3) the battery connection to ring lead 202.

Relay 4RSS, released, disconnects the ringing toward the originating extension at the make contacts of respective transfer pairs 4RSS–1(2) and 4RSS–2(2); opens at makes contact 4RSS–8(2) one operate path of relay 2RLS; and releases relay 4HMS by interrupting the hold path at make contact 4RSS–6(4). Relay 4HMS, released, releases relay 5RSD by removing the trunk fundamental holding ground at make contact 4HMS–6(4) and also releases all other relays held operated to the fundamental ground. Relay 5RSD, released, removes ringing toward the terminating end at the make contacts of transfer pairs 5RSD–9(3) and 5RSD–7(3) this being in the event called extension 102 had not previously responded to the ringing. When the originating and terminating trunk hold magnetts, 4THM and 5THM, release in the manner previously described both the calling and called extensions are disconnected from the trunk. Relay 2RLS releases following release of relay 5HMD and the trunk is restored to normal.

It may, of course, happen that the calling party, after having established the camp on and gone on hook, may leave his location and not be available to answer his extension when it is rung back. The feature described above, whereby the ringback is automatically canceled and the circuits returned to normal if the caller does not respond within the fixed interval, prevents the circuits being tied up indefinitely in such an instance.

It will be assumed now for purposes of further description that the calling party after having established camp on and gone on hook may decide that he wishes to abandon the camp on and cancel the ringback so that he may free his line for initiation of an entirely different call. Accordingly, he goes off hook whereupon relay 2RLS operates from the ringing ground on lead 212, make contacts of transfer pair 4RSS–1(2), tip 201, closed station loop at station 101, ring 202, make contact of transfer pair 4RSS–2(2), make contact of transfer pair 3DR–2(2), winding of relay 2RLS to battery. Subsequent trunk action in returning to normal is similar to that described above following operation of relay 2RLS.

It will be apparent from the above description that the executive camp-on trunk arrangement contemplated by the present invention affords a number of important advantages over similar circuits known in the art. One feature of outstanding important is that the ringback will be established in the event of simultaneous hangup, or even though the called party goes on hook first so long as the calling subscriber reaches the on-hook position within the predetermined allowable interval after the called party has hung up. This feature is particularly important in commercial applications of the circuit since it avoids a source of unsatisfactory performance inherent in prior systems of this general nature where it was found that the calling party often proceeded on the assumption that ringback had been established whereas, as a matter of fact, ringback was not actually set up due to the fact that the called subscriber had reached the on-hook position during the calling party's hangup interval.

Other important advantages will be apparent also, for example that novel means are included whereby central office class trunks are prevented from camping on the line of the calling extension until the called extension has answered the call, and also that connections are completed at the originating end of the special executive trunk on a station-to-miscellaneous trunk basis and are completed at the terminating end of the trunk on a central office-to-station basis. This method permits the establishment of camp-on connections at the terminating end of the trunk and direct trunk selection at the originating end.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a private branch exchange, a calling extension and a busy called extension at said private branch exchange, means initiated by said calling extension for camping on the line of said busy called extension, means for transmitting an audible signal to said calling extension and to said busy called extension when the line of said called extension is camped on, and means effective upon said calling party first going on hook after initating camp on and said called party subsequently going on hook for ringing both extensions, said last-mentioned means being effective also if said called party goes on hook within a predetermined, relatively short, interval before said calling party goes on hook.

2. In a telephone system, a private branch exchange, a calling extension and a busy called extension at said private branch exchange, a special trunk at said private branch exchange, means initiated by said calling extension for seizing said special trunk and for establishing a connection between said calling extension and the originating end of said special trunk, means for associating switching means with the terminating end of said special trunk and for establishing a camp-on connection between said terminating end and said busy called extension, means for preventing additional camp-on connections to said busy called extension while the camp-on connection by said special trunk prevails, and means for preventing camp-on connections to the line of said calling extension while the camp-on connection by said special trunk prevails.

3. In a telephone system, the combination defined by claim 2 and further means for rendering said last-mentioned preventing means ineffective upon said called extension going on hook.

4. In a telephone system, the combination defined by claim 2 wherein the connection at the originating end of said special trunk and the connection at the terminating end of the trunk are completed on respectively different class bases.

5. In a telephone system, a private branch exchange including a calling extension and a busy called extension, means initiated by said calling extension for camping on the line of said busy extension, means for applying ringing to said called extension and ringback to said calling extension if said called extension goes on hook while said calling extension remains off hook, means for ringing both said extensions when said called extension goes on hook after said calling extension goes on hook, a timer circuit, means for initiating a timing interval of said timer circuit when said called station goes on hook and said calling station remains off hook, and means responsive to said timer circuit for causing said ringing means to operate when said calling station goes on hook within said timing interval.

6. In a telephone system, a private branch exchange, a calling extension and a busy called extension, a special trunk at said private branch exchange, means initiated by said calling extension for seizing said special trunk and for establishing a connection between said calling extension and the originating end of said special trunk, means for associating switching means with the terminating end of said special trunk and for establishing a camp-on connection between said terminating end and said busy called extension, a timing circuit, a tone source, means effective upon establishment of the camp-on connection for operating said timing circuit to measure a time interval of a first duration, means effective during said interval to apply tone from said source to said special trunk, means effective upon said called extension going on hook for operating said timing circuit to measure a time interval of a second duration, and means effective upon said calling extension going on hook before expiration of said last-mentioned interval for operating said timing circuit to measure a time interval of a third duration.

7. In a telephone system, the combination defined by claim 6 and further means also effective upon said calling extension going on hook before expiration of the interval of said second duration for ringing both extensions.

8. In a telephone system, the combination defined by claim 7 and further means for terminating the ringing toward the calling extension at the end of said interval of third duration.

References Cited

UNITED STATES PATENTS 2,819,345 1/1958 Nilsson ---------- 179—27.1 X

KATHLEEN H. CLAFFY, *Primary Examiner.*

L. W. WRIGHT, *Assistant Examiner.*